United States Patent Office 3,343,997
Patented Sept. 26, 1967

3,343,997
METHOD OF MAKING LEAD BATTERY ELEMENTS
Ernest G. Tiegel, Redwood City, Calif., assignor to Tiegel Manufacturing Co., Belmont, Calif., a corporation of California
No Drawing. Filed May 24, 1965, Ser. No. 458,444
5 Claims. (Cl. 136—176)

ABSTRACT OF THE DISCLOSURE

The present invention provides a method of making lead battery elements which improves the process for making lead battery units in which the lead plates are formed integrally with connector lugs and attached to opposed battery straps by either the "cast on" process or by "burning," in which the flux used for the welding leg attachment is also capable of providing a protective coating and is applied to the lugs of the battery plates immediately after the plates are cast whereby the flux protects the lugs from injury during subsequent processing of the plates, such as the application of lead oxide thereto, and also serves as a flux for welding the plate lugs to the opposed battery strap.

---

The present invention relates to improvements in a method of making lead battery elements, and more particularly to a method of making lead battery elements which constitutes the lead units in which the lead plates are formed integrally with connector lugs and battery post straps.

Storage batteries made from lead plates are well known and are in widespread use in the automotive and other industries because of their ability to supply a rather large current on demand in a small unit. Conventionally, these batteries are made from lead plates which are treated to provide positive plates and negative plates with an electrolyte therebetween in accordance with the well known Planté system where lead peroxide serves as one pole and molten lead as another, and the electrochemical reaction being the formation of intermediate lead oxide on each plate.

In accordance with usual practices, these batteries are made by first casting a group of flat rectangular plates having projecting lugs at one corner thereof with the plates being cast entirely of lead. The plates are then pasted to add lead oxide thereto. The pasting formulations vary slightly for positive and negative plates in accordance with well-known procedures. The plates may then be assembled into complete battery units and formed or "charged" in sulfuric acid to provide a conventional battery, or, alternatively, the plates may be formed in sulfuric acid at any time during the manufacture of the battery. The forming of the plates before assembly thereof has been rather common in the manufacture of the so-called "dry charge" battery.

In all of these systems, however, the connector lugs of the plates are attached to connector battery straps having appropriate terminal posts in order to provide the aligned assembly of stacks of positive and negative plates and the necessary electrical connections therefor. The attachment of the plates to the connector lugs is conventionally done either by a method known as the "cast on" method or by another method known in the art as a burning operation. In its broad aspect, the present invention relates to improvements in the procedures relating to the formation of the integral plate and battery strap unit, whether the assembly is accomplished by the cast on process or by a burning operation. However, the present invention is particularly advantageous when used with a cast on process and will be described in detail in connection with such a process.

In the burning process, the battery plates are cast separately and the battery connector straps and terminal posts are also cast separately. The plates are then burned onto the connector straps in proper position to provide a good electrical connection and an integral unit consisting of a group of plates attached to a single connector strap and terminal post. The completed battery cell, of course, contains a group of positive plates attached to a terminal strap and a group of negative plates attached to a different terminal strap. A typical battery will contain, say, three cells, six cells, or a different number, depending upon the voltage desired. However, the present invention is directed to the assembly of the battery plates and the connector strap, whether it be a group of positive plates or a group of negative plates. In other words, the invention is advantageous for the processing of both types of plates.

In assembly, according to the cast on process, the plates are provided in aligned relationship and positioned in the desired spaced relation and brought into physical contact with the battery connector straps while the battery connector straps are being cast and are still in a molten condition. This eliminates the burning operation, since the casting and burning is provided simultaneously. However, the cast on process has been rather difficult to achieve and still obtain good, high quality products, and therefore the burning process has continued. However, in the co-pending application Ser. No. 372,524, filed June 4, 1964, entitled Method and Apparatus for Fabricating Battery Connector Straps, there is described an improved method and apparatus for carrying out the cast process and this has made the process quite practical. Accordingly, in its preferred form, the present invention is utilized together with the cast on process described in the above-mentioned application.

As indicated above, whether the battery plates are attached to the connector lug by a burning process or by a cast on process, the operation is substantially a welding operation and since lead tends to form oxide rather easily, it is desirable to utilize a flux in carrying out the welding. In the cast on process in particular, it has been found desirable to completely clean the lead battery lugs and provide them with a liquid flux composition that will protect the lugs and assist in the obtaining of a desirable weld.

As used herein, the term "lead" is used both in connection with the battery plates and with the battery plate straps, to be construed to include lead alloys which contain a major portion of lead in accordance with the usual procedures. For example, the lead plates which are used prior to pasting and forming generally contain 4% antimony and therefore the lug composition will be 96% lead and 4% antimony. Obviously, any other suitable alloy could be used and the present invention is to be in no way limited by the exact composition of the plates or connector straps.

Referring again to the fabrication of the units of positive or negative plates, these units are conventionally formed by casting the plates and trimming them on a casting or trimming machine to provide lead plates of the desired size and shape. These lead plates are generally left a few days to harden and are further processed on the pasting machine, where they are pasted. Specifically, lead sulfate is pasted on and the sulfate also contains oxide lead and water in accordance with standard procedures.

As indicated above, both the positive plates and negative plates are pasted, but generally with slightly different paste compositions. The exact compositions are well known to those skilled in the art and are not critical to the present invention. After pasting, the plates are dried and the assembly is accomplished by either the burning process or the cast on process which requires cleaning of the lugs and generally a fluxing thereof before the actual operation takes place.

During processing, as indicated above, frequent problems have arisen from the contact of connector lugs with the paste in the pasting machine, and care must be taken to avoid this problem. Such care will tend to slow down even an experienced operator. In addition, the plates may be formed before assembly with sulfuric acid in one of the procedures for making dry charge batteries and, in this case, care must be taken to protect the lugs from sulfuric acid. Moreover, the plates will be subjected to atmospheric corrosion and the like under factory atmospheric conditions, so that it is necessary to clean the lugs before fluxing and casting on of the connector straps in order to provide the desired results.

Accordingly, it is a primary object of the present invention to eliminate the above-mentioned problems and provide a process for making lead battery elements in which a composition is added to certain of the surfaces of the lead for the dual purpose of protecting said surfaces and for providing a flux in subsequent operations.

Another object of the invention is to provide such a process in which the metal surfaces of the plate are protected from oxidizing, carbonizing or sulfating while being stored in the battery factory before use.

A further object of the invention is to provide a process for making lead battery elements in which the material is provided early enough to serve the dual purpose of protecting the surfaces and facilitating easier lead burning or acting as a fluxing agent for attachment of the plates to the lugs in the so-called cast on process.

Still another object of the invention is to provide a process of the character described in which the lugs of the plates are protected during the pasting process so that the pasting process may be speeded up without danger of injury to the lugs.

Yet another object of the invention is to protect the plate lugs from oxidation during formation in processes where the plates are formed prior to assembly thereof onto the lugs.

Further objects and advantages of my invention will be apparent as the specification progresses, and the new and useful features of my method for making lead battery elements will be fully defined in the claims attached hereto.

In general, the invention provides a method of making an integral lead unit for batteries and lead plates having connector lugs and battery post straps comprising the steps of applying a liquid flux composition to the lugs of the battery plate to be welded onto the battery straps at a time well in advance of the welding operation, and then welding the fluxed lugs of the battery plates to the battery straps.

Preferably, the flux should not only be capable of serving as a flux for facilitating the process of melting two adjacent lead surfaces into each other to provide a good weld bond, but it should also provide a protective coating. Accordingly, the sooner the flux is applied to the lugs of the battery plates, the more protection is obtained, and in its preferred form, the flux is applied to the lugs immediately after casting and while the plates are still on the trimming machine. However, it will be appreciated that beneficial results will be obtained if the flux is applied in advance of any one of the steps whereby the plate is treated prior to the welding process so as to protect the lugs during this step, or, alternatively, where the plate is to be stored.

In general, any flux having the above-mentioned properties may be suitable. I prefer to use fatty acids, either alone or together with other fluxing agents dissolved in a suitable solvent such as methyl alcohol or ethyl alcohol. Another preferred example of the suitable flux includes a saturated solution of a wood resin (also known as colophonium) in alcohol. The alcohol is preferably an aliphatic alcohol having from one to five carbon atoms such as methyl alcohol or ethyl alcohol.

In addition, it is sometimes advantageous to include a lacquer in the flux composition in order to increase the resistance of the coating to sulfuric acid to protect the lugs during forming and to increase protection from the corrosive effects of the fumes normally present in a battery factory. Accordingly, a lacquer should be selected that has good resistance to sulfuric acid and which will substantially completely burn during the heating in the welding step. Such compositions are well known to those skilled in the art. An important criterion is that the flux be a liquid-like material which will completely cover the lug and air dry at ambient temperatures. The composition must also be capable of providing both a protective coating and serving as a flux agent during welding.

In some cases where the welding is effected prior to forming with sulfuric acid and the atmosphere of the plant is substantially non-corrosive, no lacquer is needed in the flux. When it is desirable to use lacquer, a small amount such as, say, about 1% by weight of the final composition, will be beneficial. The maximum permissible amount will depend on the particular lacquer and amount of solvent therein. However, it should not be too high to burn during the heating preceding the actual welding, and amounts in excess of 50% by weight of the total composition are best avoided.

As indicated above, the flux composition is placed onto the plate lugs and allowed to air dry thereon so that the lugs may be protected during storage, pasting, or during forming if the plates are to be formed prior to assembly thereof.

In order to illustrate the invention more fully, the following examples are given, and it will be appreciated that these examples are given for the sake of illustration only and are not intended to limit the scope of the invention.

EXAMPLE 1

A suitable flux is prepared by dissolving a pine wood resin (colophonium) in methyl alcohol to provide a saturated solution thereof. This solution is then used for coating in the following procedure:

Lead plates are formed by casting a lead composition in the usual manner and, after formation of the lugs, the plates are immediately coated with the flux solution mentioned above. The coated plates are then allowed to air dry at ambient temperature. This is achieved during the early portion of the few days of storage to which the plates are subjected in order to allow the cast plates to harden to the extent desired.

After the plates are hardened, they are then placed on a pasting machine where a mixture of lead sulfate, lead oxide, lead and water is pasted onto the plates in accordance with the usual procedure. Although this usual procedure calls for pasting the entire plate except for the lug and careful operators can avoid contacting the lug with paste, it has been found that the protective coating on the lug allows more rapid pasting to proceed since any paste which inadvertently contacts the lug may be wiped off easily without damage to the lug or interference with the subsequent welding.

After pasting, the plates are dried quickly and then stored for a time sufficient to dry fully. After the plates have been thus dried, they are preferably cast on to battery straps by utilizing the procedure described in the co-pending application Ser. No. 372,524, filed June 4, 1964, cited above. However, any other known cast on procedure may be used.

EXAMPLE 2

The procedure of Example 1 is repeated except that after the plates have been stored for drying following the application of paste, they are fastened to the post battery straps by burning them on in accordance with any of the conventional procedures for the burn on process.

EXAMPLE 3

The procedure of Example 1 is repeated except that a different flux composition is used and after the plates have been dried after application of paste, they are assembled in the forming apparatus and formed out in sulfuric acid in accordance with conventional procedures for forming plates and making dry charge batteries. The flux composition is prepared to resist sulfuric acid and is made by adding lacquer to the composition described in Example 1. Specifically, the composition is made by adding one part by weight of lacquer to two parts by weight of a saturated solution of wood resin in methyl alcohol. The formed plates are then attached to the battery straps by the cast on process.

EXAMPLE 4

A group of lead battery plates are formed on a casting machine and hardened according to the conventional procedure. The plates are then put through the pasting machine and the lugs are cleaned off and coated with the fluxing solution described in Example 1 above. The plates are then stored to complete drying, assembled into dry groups, and formed out in acid in accordance with the usual procedure for making dry charge batteries. The plates are then cast on to the battery lugs to form integral units suitable for assembly into dry charge batteries.

EXAMPLE 5

The procedure of Example 1 is repeated through the drying period following application of paste. The plates are then attached to post battery straps by the burn on process and the assembled unit is formed out in sulfuric acid to make a dry charge battery.

From the examples above, it is seen that beneficial results are achieved in the attachment of the lugs to the post battery straps when the flux of this invention is applied and allowed to air dry because the flux protects and assures that the lugs to be attached are completely clean so that an especially good attachment may be achieved. In addition, where the flux is applied at the early stage as in the preferred form, cleaning of the battery lugs is completely eliminated. In addition, with the lugs thus protected, there is no eroding away or damage to the lugs caused by cleaning or injury due to extra treatment.

From the foregoing description, it is seen that I have provided an improved process for making lead battery elements in which a rather simple but extremely effective change is effected in the process procedures and that a double function for the flux utilized is provided together with other advantages.

I claim:

1. In a method of making an integral lead unit comprising the steps of casting a plurality of lead battery plates having lugs on one side thereof on a casting machine, allowing the cast battery plates to harden by storage for a period of time, applying lead oxide to the surfaces of the plates except for the lug areas by adding a lead oxide paste to the plate areas on a pasting machine, allowing the paste to dry, and then welding the plate lugs to a post battery strap in the desired orientation, in combination, the step of applying a liquid flux composition to the lugs of the battery plates immediately after the plates are cast, said liquid flux composition having the property of providing a protective coating to the plate lugs and also being activated on heating during the welding operation to provide a good weld joint.

2. The method of making integral lead units defined in claim 1, in which the flux also contains a certain amount of lacquer.

3. In a method of making an integral lead unit comprising the steps of casting a plurality of lead battery plates having lugs on one side thereof on a casting machine, allowing the cast battery plates to harden by storage for a period of time, applying lead oxide to the surfaces of the plates except for the lug areas by adding a lead oxide paste to the plate areas on a pasting machine, allowing the paste to dry, and then welding the plate lugs to a post battery strap in the desired orientation, in combination, the step of applying a liquid flux composition to the lugs of the battery plates prior to placing the battery plates in the pasting machine.

4. In a method of making an integral lead unit comprising the steps of casting a plurality of lead battery plates having lugs on one side thereof on a casting machine, allowing the cast battery plates to harden by storage for a period of time, applying lead oxide to the surfaces of the plates except for the lug areas by adding a lead oxide paste to the plate areas on a pasting machine, allowing the paste to dry, and then welding the plate lugs to a post battery strap in the desired orientation, in combination, the step of applying a liquid flux composition to the lugs of the battery plates immediately after the plates are cast, said liquid flux composition having the property of providing a protective coating to the plate lugs and also being activated on heating during the welding operation to provide a good weld joint, and thence assembling the plates and forming them in sulfuric acid to provide plates suitable for assembly into dry charge batteries.

5. In a method of making an integral lead unit comprising the steps of casting a plurality of lead battery plates having lugs on one side thereof on a casting machine, allowing the cast battery plates to harden by storage for a period of time, applying lead oxide to the surfaces of the plates except for the lug areas by adding a lead oxide paste to the plate areas on a pasting machine, allowing the paste to dry, forming the plates in sulfuric acid, and then welding the plate lugs to a post battery strap, in combination, the step of applying a liquid flux composition to the lugs of the battery plates before the plates are formed in sulfuric acid, said composition consisting essentially of a saturated solution of a fatty acid flux in an aliphatic alcohol solvent and from about 1 to 50% by weight of a lacquer resistant to sulfuric acid and capable of burning substantially completely under temperatures used for welding lead.

References Cited

UNITED STATES PATENTS 2,563,936  8/1951  Huntsberger _____ 136—36
3,238,579  3/1966  Sabationo et al. ____ 136—176

WINSTON A. DOUGLAS, *Primary Examiner.*

D. L. WALTON, *Assistant Examiner.*